Patented Feb. 10, 1931

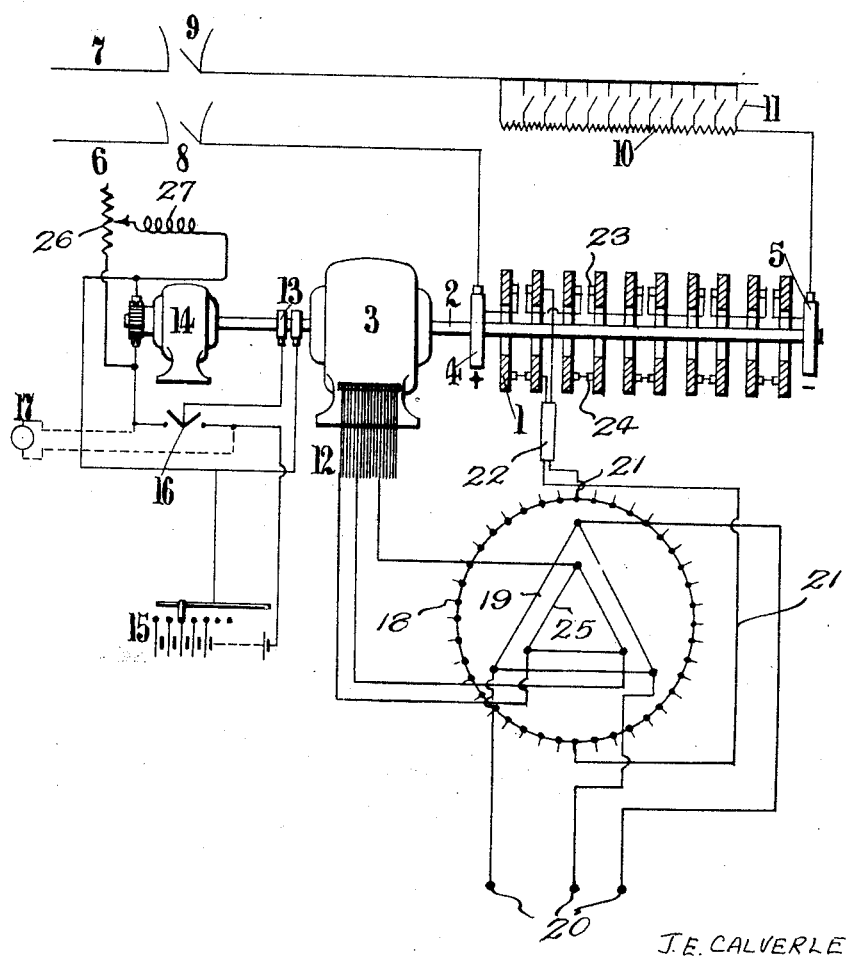

1,791,861

UNITED STATES PATENT OFFICE

JOHN EARNSHAW CALVERLEY, OF PRESTON, AND WILLIAM EDEN HIGHFIELD, OF LONDON, ENGLAND, ASSIGNORS TO THE ENGLISH ELECTRIC COMPANY LIMITED, OF LONDON, ENGLAND, A BRITISH COMPANY

ELECTRIC CONVERTING APPARATUS

Application filed April 5, 1927, Serial No. 181,206, and in Great Britain April 13, 1926.

This invention relates to apparatus for converting between alternating and direct current, the apparatus being of the kind in which a transformer or group of transformers is employed having one set of windings connected to the alternating current terminals and the other set of windings connected together to form a closed ring from which tappings are taken off to the segments of a commutator or group of commutators on which work brushes connected to the direct current terminals, the relative rotation between brushes and commutator being produced by means of a motor of the synchronous alternating current type which is fed from the alternating current side of the apparatus. The invention deals with the starting of such apparatus from the direct current side.

It will be understood that if a steady direct current flows through the commutating gear and the transformer windings connected therewith, while the synchronous motor remains stationary, the presence of that current will have no tendency to cause the motor to start since it will produce no current on the alternating current side of the apparatus. It is found, however, that if the current on the direct side of the apparatus be varied suddenly, a current impulse can be transmitted through the transformer and provided that the synchronous motor field is excited this motor will produce movement of the commutation gear which by its action on the apparatus will cause alternation in the current to take place so that the rotation of the motor continues and will increase in speed.

In accordance with this invention, therefore, the starting arrangement comprises means for exciting the field of the synchronous motor and for producing a sudden variation in current supplied through the direct current terminals of the apparatus. The simplest method of producing this sudden variation is generally the connection of the direct current terminals to the line through a restistance of appropriate value so that the closing of the circuit is accompanied by a current impulse. The resistance may be arranged as a series resistance or as a potentiometer or any other method may be employed for applying the appropriate potential difference to the direct current terminals.

The accompanying diagrammatic drawing will be used to explain the application of the present invention to apparatus of the kind described and illustrated in a practical embodiment in the specification and drawings of British Patent No. 216,690 and in "Engineering" published in London on May 2nd 1924 and described and illustrated diagrammatically in the specification and drawings of United States Patent No. 1,656,972. For the purpose of obtaining simplicity and avoiding confusion the present drawing has been restricted to a diagrammatic showing of the apparatus, particularly that part of it mounted on the transformer cores. The circuits essential for the starting up process in accordance with the present invention have been indicated in this approximate diagrammatic showing. Further particulars of these circuits and the manner in which they function during normal operation of the apparatus as distinct from during the starting period can be obtained from the specification and drawings of the above mentioned United States patent.

On the transformer cores (not shown) of the converting apparatus are mounted a number of windings which we refer to as a matter of convenience as secondary windings. These are connected together to form a symmetrical closed ring winding indicated by 18 in the accompanying drawing. The transformer cores also carry windings spoken of for convenience as primary windings connected or adapted to be connected to a polyphase system. In the drawing a three-phase delta connection is indicated by the reference 19 connected to three terminals 20 which may be joined to an external load or generator. Under the conditions assumed for starting in accordance with the present invention, the external alternating current polyphase system will take no part in the process of starting up the apparatus. The winding 19 will in practice not be the simple delta winding indicated in the drawing which has only been adopted as a matter of convenience. Its more complex structure can be ascertained by reference to Patent No. 1,656,972. It is to be understood that while only a single closed winding 18 has been shown, there will in practice be a considerable number of these windings, in fact one for each of the stationary disc commutators 1. For the purpose of the present invention, however, the action of each one of these windings may be considered to be identical and therefore it is unnecessary to consider more than one of them. Each of these closed windings is connected by tappings taken at equally spaced points thereon through connections such as 21 to the segments of its commutator 1. For the purpose of the diagram it is assumed that these connections for the winding shown are carried through a multi-core cable 22 between the transformer group and the commutator but only two of the connections are shown beyond the ends of this cable. On the stationary commutators 1 operates brush gear indicated diagrammatically by upper and lower pairs of brushes and interconnections 23 and 24. This brush gear is mounted and rotated by shaft 2 which is driven by a synchronous motor 3.

By their brush gear the commutators 1 and the windings connected with them are put in series so as to get a voltage difference between the sliprings 4 and 5 equal to the sum of the voltage difference across each commutator. The brushes on the sliprings accordingly form the direct current terminals of the apparatus and are connected to the high tension direct current lines 6 and 7 through circuit breakers 8 and 9.

The starting resistance 10 is connected between one of the sliprings 5, which is preferably the negative terminal, and the circuit breaker 9. This resistance is shown as divided into sections each one of which can be short circuited in turn by the operation of the switches 11 in sequence starting from the left hand end.

The synchronous motor 3 is connected either directly or inductively with the polyphase system by way of the windings on the transformer cores of the apparatus. In the present case inductive coupling is indicated, a delta winding 25 being arranged so as to couple with the secondary and primary windings 18 and 19 by means of the magnetic fields of the transformer group. In the example shown in the drawing, it is assumed that the synchronous motor performs the additional function when the apparatus has been run up to speed of stabilizing the wave form of the flux in the transformer cores by impressing on each core a definite wave shape as set out in the specification of Patent No. 1,656,972. For this purpose the large number of wires 12 shown as connected with the motor 3 are used to establish a link between the alternating current winding of that motor and certain windings on the transformer cores. For the purpose of the present invention it is unnecessary to consider this stabilizing action and only three of the connections 12 are shown as extending to the transformer arrangement and connecting with the delta winding 25. During starting the remaining wires 12 may be disconnected from their associated windings on the transformer cores since the single delta winding 25 and its three connections suffice for the circulation of energy between the winding of the motor 3 and the windings on the transformer cores.

The direct current for exciting the field of the synchronous motor 3 is supplied by way of the sliprings 13 and may have its source in either the exciter 14 or the battery 15, the change from one supply to the other being made by the switch 16. It is intended that the exciter will be used for the normal operation of the apparatus and that the battery will only supply energy to the field during the starting operation. In place of the battery 15 any other source of direct current which is independent of the rotation of the shaft 2 may obviously be employed. For the purpose of starting up the apparatus from the D. C. side, that is, by energy received from the mains 6 and 7, we start with all the switches 11 of the starting resistance open, leaving the whole of the resistance in circuit between the slipring 5 and the circuit breaker 9. The field of the motor 3 is then excited by placing the change-over switch 16 in the right hand position in which it puts the battery 15 into circuit with the sliprings 13. The circuit breakers 8 and 9 are then closed and this causes a current to commence to flow from the positive main 6 through the slipring 4 and the windings of the transformers connected with the commutators, then through the slipring 5 and resistance 10 to the negative main 7. In passing between the sliprings 4 and 5 the current must make use of the path through the brush gear 23 and 24. At each commutator the connection between these two sets of brushes is effected by the pair of commutator segments on which the brushes are resting and the connections 21 between these segments and diametrically opposite points on the closed secondary winding 18 to which these connections lead. Accordingly, the current flows through two parallel paths formed by the two halves of the closed ring winding. In so doing it magnetizes the cores on which these windings are placed, producing a flux impulse in each core. This impulse gives rise to a transient electro-motive force in the winding 25 which electro-motive force is by way of the connection 12 applied to the alternating current winding of the synchronous motor 3. Accordingly, a current impulse flows through the winding 25, the connections 12 and the alternating current winding of the motor 3. This impulse of current re-acts with the field which, as previously indicated, has been excited by direct current in the motor 3. Accordingly, a torque impulse is produced causing the shaft 2 to begin to turn. As soon as this turning takes place the movement of the brushes 23 and 24 over the segments of the commutators 1 causes the connections between these brushes and the secondary winding 18 to be changed so that the points of entry and departure of current at this winding move round from the points shown to the adjacent tapping points to which other connections 21 (not shown) are attached. This causes the current to undergo reversal in some of the sections of the winding 18 on the transformer cores thus producing flux changes which are appropriate for producing alternating current in the winding of the motor 3 and ensuring the continuance of the rotation. It is found that the result of this action is to produce a continuance of the torque which tends to accelerate the shaft 2 and this acceleration producing more rapid flux changes in the transformer cores gives rise to increased electromotive forces in the winding 25, thus further increasing the torque and the acceleration. This will continue until the limiting effect of the resistance 10 becomes evident, that is to say, the energy which this resistance permits to pass from the direct current mains to the motor 3 by way of the converting apparatus is absorbed in the losses in this apparatus and in the motor and in the work of maintaining the brush gear in rotation at a particular speed.

It is of course not essential that the initial impulse should be produced by the closing of the circuit breakers 8 and 9. It may be produced by manipulation of the starter the resistance being arranged so that the initial impulse due to the closing of the circuit through the breakers 8 and 9 is not sufficient to cause the machine to start. As, however, the inertia of the parts to be set in motion is not very great, a comparatively small current impulse will suffice; for instance, it has been found that on a transverter of 50,000 volts direct current rating and 2,500 kilowatt capacity, the application of 400 volts to the direct current terminals (sliprings 4 and 5) will cause the motor to start. The current impulse is about 1.5 amperes and the steady current when rotation has commenced is one ampere. After the motor has been set in rotation by this means increase in the voltage applied to the sliprings 4 and 5 by the process of short circuiting sections of the starting resistance 10 by the switches 11 produces increase in speed until the full value has been reached. Final adjustments of the speed can be made by varying the strength of current supplied to the sliprings 13 for the field of the motor by means of the rheostat 26 in the circuit of the field 27 of the exciter 14. It will be seen that the combination of commutator, transformer and motor behaves like a direct current motor, the transformer simply being used as an inductive link between the commutator and the armature windings. During the initial stages of starting the apparatus behaves like a direct current motor started by varying the resistance in the armature circuit. During final speed adjustment the apparatus behaves like a direct current motor under speed control by varying the strength of the field.

It will be understood that after rotation has commenced, the rate of increase of applied voltage is not material, but before rotation takes place it is possible by making the application of potential difference to the D. C. terminals sufficiently gradual to produce the flow of direct current without producing rotation.

When the shaft 2 has been accelerated to approximately the full speed, the excitation current supplied to the sliprings 13 may be taken from the exciter 14 instead of from the battery 15, the change-over being effected by the switch 16 after adjusting the field of the exciter 14 so that there is no material voltage difference between the battery and exciter terminals with which the contacts of the switch 16 are connected. For rendering this adjustment easy a voltmeter 17 may be connected across these terminals as indicated by dotted lines. The switch 16 or other switching arrangements may be utilized if desired for connecting the battery with the exciter 14 during normal running for the purpose of charging the battery.

After the shaft 2 has been brought up to full speed three phase alternating electromotive forces of full frequency are available at the terminals 20 and an appropriate load may be applied to these terminals. If the apparatus is to be paralleled with any other source of alternating current it will of course be necessary to apply the ordinary synchronizing gear and to carry out the paralleling in a manner similar to that adopted with a rotary converter when started up from the D. C. side, the necessary speed adjustment being made by regulation of the strength of the field of the motor 3 by means of the rheostat 26 in the field circuit of the exciter 14.

It will be understood that the application of the invention to a particular type of apparatus has only been described by way of example.

What we claim as our invention and desire to secure by Letters Patent is:—

The method of starting an alternating current synchronous motor arranged for driving apparatus for converting direct current to alternating current comprising relatively rotating brushes and commutator segments and a transformer with a closed winding the sections of which are connected to said commutator segments, another winding for supplying the A. C. load and a winding for supplying said synchronous motor, which consists in applying to said motor a transient current impulse whilst its field is excited produced by a sudden change in value of direct current applied to the same terminals of the apparatus as receive the direct current to be converted.

In testimony whereof we affix our signatures.

JOHN EARNSHAW CALVERLEY.
WILLIAM EDEN HIGHFIELD.